March 21, 1939.  D. R. SHOULTS  2,151,163
METHOD OF AND APPARATUS FOR PULLING SYNCHRONOUS MACHINES INTO STEP
Filed Jan. 23, 1937
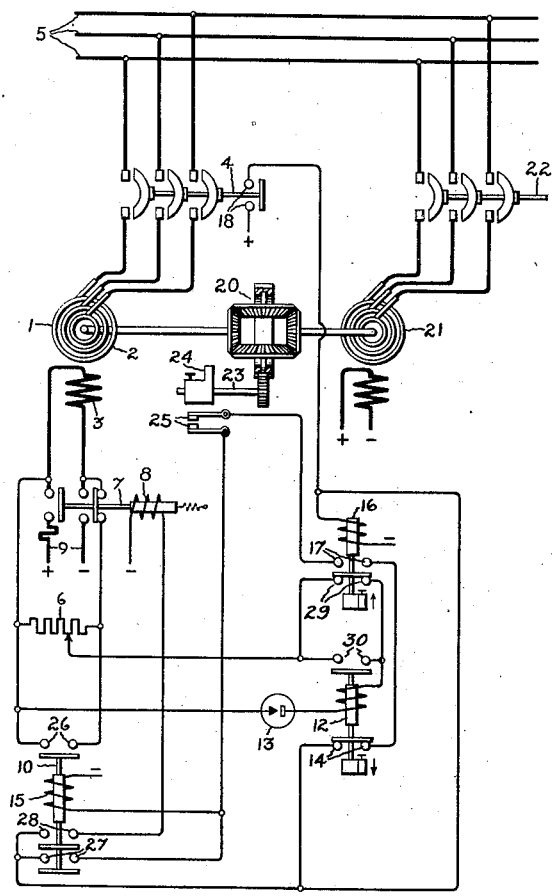
Inventor:
David R. Shoults,
by Harry E. Dunham
His Attorney.

Patented Mar. 21, 1939

2,151,163

UNITED STATES PATENT OFFICE 2,151,163

METHOD OF AND APPARATUS FOR PULLING SYNCHRONOUS MACHINES INTO STEP

David R. Shoults, Schenectady, N. Y., assignor to General Electric Company, a corporation of New York Application January 23, 1937, Serial No. 122,036

20 Claims. (Cl. 172—289)

My invention relates to a method of and apparatus for pulling a synchronous machine into step, and its object is to provide a new and improved method and apparatus for accomplishing this result.

One of the usual methods of synchronizing a synchronous machine is to operate the machine with its armature winding connected to an alternating current source and its field winding short-circuited through a discharge resistor and to apply excitation to the field winding when the machine speed is above a predetermined value.

In order that a synchronous machine may develop its maximum pull-in or synchronizing torque, it has been the practice to effect the synchronizing thereof by simultaneously opening the discharge resistor circuit and connecting the field winding to a source of excitation at the intant of maximum main flux linkages when the polarity of these flux linkages corresponds to that resulting from the applied field excitation. This instant of maximum field flux linkages occurs substantially at the point on the slip cycle of induced field current where the induced field current starts to build up in the field winding in the same direction that the direct current flows through it during synchronous operation. With large apparatus, the time required for the closing of suitable field application means may be appreciable with respect to the length of the slip cycle so that variations in the time of operation of the field application means after its operation is called for may vary the point in the slip cycle at which excitation is applied and thus lessen the value of load which may be synchronized.

My investigations and tests show that substantially the same pull-in or synchronizing torque can be obtained by short-circuiting the discharge resistor at this same point and subsequently applying field excitation. The short-circuit around the discharge resistor increases the time constant of the field circuit so as to delay any change in the flux linkages existing at the instant the short-circuit is closed for a sufficient length of time to allow these flux linkages to pull the machine into step. This allows the use of fast operating devices for initiating the synchronizing operation as they are required for intermittent service only and may consequently be designed so as to have high operating speed. The slower field application means may then be closed a short time thereafter without appreciable loss of synchronizing ability.

My invention will be better understood from the following description when taken in connection with the accompanying drawing, the single figure of which diagrammatically illustrates a synchronous motor starting system embodying my invention, and its scope will be pointed out in the appended claims.

Referring to the drawing, I represents a synchronous motor which is provided with an armature 2 and a field winding 3. In order to simplify the disclosure, I have shown my invention in connection with a full voltage starting arrangement for a synchronous motor so that it is started by connecting the armature 2, by means of a suitable manually controlled switch 4, directly across an alternating current supply circuit 5 while the field winding 3 is short-circuited through a discharge resistor 6. Therefore, normal supply circuit voltage is supplied to the motor armature winding to start the motor as an induction motor. In practice, the motor will also usually have a squirrel cage winding, which is not shown. While I have shown a full voltage starting equipment, it will be understood that any other well-known synchronous motor starting equipment may be employed to start the motor from rest and accelerate it to approximately synchronous speed.

The connection of the field winding 3 to the discharge resistor 6 is completed by means of a two-position field switch 7 when it is in the position in which it is shown. This switch 7 is provided with an operating winding 8, which, when energized, causes the switch 7 to move from the position in which it is shown to its other position, in which it connects the field winding 3 to a suitable source of excitation 9.

In accordance with my invention, I provide an arrangement for first short-circuiting the field discharge resistor 6 through a low impedance circuit at a predetermined point in the slip cycle of the motor I after it reaches a predetermined subsynchronous speed and subsequently operating the field switch 7 to connect the field winding 3 to the source of excitation 9.

In order to accomplish this result, I provide a quick acting switch 10 which, when closed, short-circuits the field discharge resistor 6. For controlling the operation of this switch 10 in response to the motor speed reaching a predetermined value, I provide the frequency responsive relay arrangement disclosed in United States Letters Patent 1,958,250, granted May 8, 1934, to H. T. Seeley, assignor to the same assignee as this application. As shown in the drawing, this frequency responsive relay arrangement includes a time relay 12 and a half-wave rectifier 13 connected in series across a portion of the discharge resistor 6. With such an arrangement, the induced current which flows through the motor field winding 3 while the motor I is operating below synchronous speed causes the relay 12 to pick up and remain in its picked up position until the motor reaches a predetermined subsynchronous speed, at which time the frequency of the induced current becomes so low that the half cycle during which substantially no current flows through the relay winding is just long enough to allow the relay to return to its normal position at the end of that half cycle of slip frequency current. The contacts 14 of the relay 12 are connected in the energizing circuit of the operating winding 15 of the quick acting switch 10 so that it cannot close until the motor speed is above a predetermined value.

In order to insure that the switch 10 is not closed until after the motor 1 has started and the relay 12 has had time to open its contacts 14, I provide a relay 16, which has its contacts 17 connected in series with the contacts 14 of relay 12 and the operating winding 15 of the switch 10. The circuit of the winding of relay 16 includes the auxiliary contacts 18 of the switch 4 so that the relay 16 is energized when the switch 4 is closed. The relay 16 is designed in any suitable manner so that it does not close its contacts 17 until after the relay 16 has been energized for a predetermined time. Therefore, when the switch 4 is closed to start the motor 1 the relay 12 has time to open its contacts 14 before the relay 16 closes its contacts 17.

For effecting the closing of the switch 10 at the instant of maximum flux linkages in the motor, I provide a differential gear mechanism 20, one gear of which is driven by the motor 1 and another gear of which is driven by an unloaded pilot synchronous motor 21 connected to the supply circuit 5 by a suitable switch 22. The differential gear mechanism 20 is arranged in any suitable manner so that it drives a shaft 23 at a speed of one revolution for each slip cycle of the motor 1 relative to the speed of the motor 21. On the shaft 23 is fastened an adjustable cam 24, which is arranged to close the contacts 25 at a predetermined point during each revolution of the shaft 23 and consequently at a predetermined point in each slip cycle of the motor 1. The contacts 25 are connected in series with the contacts 17 of relay 16 and the contacts 14 of the relay 12 in the circuit of the operating winding 15 of switch 10. Therefore, after the motor 1 reaches a predetermined speed so that the relay 12 closes its contacts 14, the cam 24 closes contacts 25 and completes the energizing circuit for the operating winding 15 at a predetermined point in the slip cycle of the motor 1. In addition to short-circuiting the resistor 6, the closing of the switch 10 is also arranged to effect the completion of an energizing circuit for the operating winding 8 of the switch 7 so that the field winding is connected to the source of excitation 9.

The operation of the arrangement shown in the drawing is as follows: When it is desired to start the motor 1, the synchronous motor 21 is first placed in operation. Then the switch 4 is closed so that the full voltage of the supply circuit 5 is applied to the armature 2 of the motor 1 to start this motor from rest and accelerate it to approximately synchronous speed. As soon as the motor armature winding is energized, a voltage of slip frequency is induced in the motor field winding 3 and this voltage causes a current of slip frequency to flow through the field winding 3 and the discharge resistor 6 and a pulsating current to flow through the rectifier 13 and the winding of relay 12, which are connected across a portion of the resistor by the contacts 29 of relay 16. Until the motor reaches substantially synchronous speed, the magnitude and the periodicity of the rectified current through the winding of relay 12 are such that the relay picks up and maintains its contacts 14 open. The closing of the auxiliary contacts 18 of the switch 4 completes an energizing circuit for the time relay 16, but this relay does not open its contacts 29 and close its contacts 17 until after the relay 12 has operated to close its contacts 30 in shunt to the contacts 29 and to open its contacts 14 in series with the contacts 17.

The relay 12 is so adjusted that when the motor reaches the speed from which it is desired to pull the motor into step the frequency of the induced current in the field winding 3 and the resistor 6 is then low enough to allow the relay to return to its normal position at the time when the induced field current is approximately zero. The next time that the predetermined point in the slip cycle of the motor 1 at which it is desired to synchronize the motor is reached after the relay 12 closes its contacts 14, the cam 24 closes its contacts 25 to complete an energizing circuit for the operating winding 15 of the switch 10 through the contacts 17 of the relay 16 and the contacts 14 of the relay 12 and the contacts 18 of the switch 4. The closing of the contacts 26 of the switch 10 completes a short-circuit around the discharge resistor 6 which increases the time constant of the field circuit so that the flux linkages remain substantially constant long enough to pull the motor into step. By closing its contacts 27, the switch 10 completes a locking circuit for itself around the contacts 25, 17, and 14, and by closing its contacts 28, completes an energizing circuit for the operating winding 8 of the switch 7 so that the field winding 3 is subsequently connected to the source of excitation 9 to maintain the motor in step.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. The method of pulling into step a synchronous machine that is operating at a subsynchronous speed with its field winding connected in a closed electric circuit including impedance means, which consists in short-circuiting said impedance means at a predetermined point in the slip cycle to pull the machine into step.

2. The method of synchronizing a synchronous machine that is operating at a subsynchronous speed with its field winding connected in a closed electric circuit including impedance means, which consists in short-circuiting said impedance means at a predetermined point in the slip cycle to pull the machine into step, and then supplying direct current to said field winding.

3. The method of pulling into step a synchronous machine that is operating at a subsynchronous speed with its field winding connected in a closed electric circuit with a discharge resistor, which consists in decreasing the effective resistance in said closed electric circuit at a predetermined point in the slip cycle to pull the machine into step.

4. The method of synchronizing a synchronous machine that is operating at a subsynchronous speed with its field winding connected in a closed electric circuit with a discharge resistor, which consists in decreasing the effective resistance in said closed electric circuit at a predetermined point in the slip cycle to pull the machine into step, and then supplying direct current to said field winding.

5. The method of pulling into step a synchronous machine that is operating at a subsynchronous speed with its field winding connected in a closed electric circuit, which consists in increasing the time constant of said closed electric circuit at a predetermined point in the slip cycle to pull the machine into step.

6. The method of synchronizing a synchronous machine that is operating at a subsynchronous speed with its field winding connected in a closed electric circuit, which consists in increasing the time constant of said closed electric circuit at a predetermined point in the slip cycle to pull the machine into step, and then supplying direct current to said field winding.

7. The method of pulling into step a synchronous machine provided with an armature winding and a field winding and operating at a subsynchronous speed with its armature winding energized which consists in short-circuiting the field winding at a predetermined point in the slip cycle to pull said machine into step.

8. The method of synchronizing a synchronous machine provided with an armature winding and a field winding and operating at a subsynchronous speed with its armature winding energized, which consists in short-circuiting the field winding at a predetermined point in the slip cycle to pull said machine into step, and then supplying direct current to said field winding.

9. The method of pulling into step a synchronous machine provided with an armature winding and a field winding and operating at a subsynchronous speed with its armature winding energized which consists in completing a relatively long time constant discharge circuit for said field winding at a predetermined point in the slip cycle to pull said machine into step.

10. The method of synchronizing a synchronous machine provided with an armature winding and a field winding and operating at a subsynchronous speed with its armature winding energized, which consists in completing a relatively long time constant discharge circuit for said field winding at a predetermined point in the slip cycle to pull said machine into step, and then supplying direct current to said field winding.

11. In combination, a synchronous machine provided with a field winding connected in a closed circuit, and means dependent upon the angular position of said field winding for increasing at any desired point in the slip cycle the time constant of said closed circuit to pull said machine into step.

12. In combination, a synchronous machine provided with a field winding connected in a closed circuit, means dependent upon the angular position of said field winding for increasing at any desired point in the slip cycle the time constant of said closed circuit to pull said machine into step, and means for subsequently supplying direct current to said field winding.

13. In a synchronous machine having a field winding, a discharge circuit for said field winding, and means dependent upon the angular position of said field winding for increasing when a predetermined optimum armature flux condition exists in the field poles of said machine the time constant of said circuit to pull said machine into step.

14. In a synchronous machine having a field winding, a discharge circuit for said field winding, means dependent upon the angular position of said field winding for increasing when a predetermined optimum armature flux condition exists in the field poles of said machine the time constant of said circuit to pull said machine into step, and means for subsequently supplying direct current to said field winding.

15. In a synchronous machine having a field winding, a resistor, a discharge circuit for said field winding including said resistor, and means dependent upon the angular position of said field winding for short-circuiting said resistor when a predetermined optimum flux condition exists in the field poles of said machine so that said flux condition is maintained for a sufficient length of time to pull said machine into step.

16. In a synchronous machine having a field winding, a resistor, a discharge circuit for said field winding including said resistor, means dependent upon the angular position of said field winding for short-circuiting said resistor when a predetermined optimum flux condition exists in the field poles of said machine so that said flux condition is maintained for a sufficient length of time to pull said machine into step, and means for subsequently supplying direct current to said field winding.

17. In a synchronous machine having an armature winding and a field winding, means for supplying alternating current to the armature winding, and means dependent upon the angular position of said field winding for short-circuiting the field winding when a predetermined optimum flux condition exists in the field poles of said machine so as to maintain said flux condition for a sufficient length of time to pull said machine into step.

18. In a synchronous machine having an armature winding and a field winding, means for supplying alternating current to the armature winding, means dependent upon the angular position of said field winding for short-circuiting the field winding when a predetermined optimum flux condition exists in the field poles of said machine so as to maintain said flux condition for a sufficient length of time to pull said machine into step, and means for subsequently supplying direct current to said field winding.

19. In a synchronous machine having an armature winding and a field winding, means for supplying alternating current to the armature winding, and means dependent upon the angular position of said field winding for completing at any desired point in the slip cycle a relatively long time constant discharge circuit for said field winding to pull said machine into step.

20. In a synchronous machine having an armature winding and a field winding, means for supplying alternating current to the armature winding, means dependent upon the angular position of said field winding for completing at any desired point in the slip cycle a relatively long time constant discharge circuit for said field winding to pull said machine into step, and means for subsequently supplying direct current to said field winding.

DAVID R. SHOULTS.